US012794107B2

(12) United States Patent
Yu

(10) Patent No.: US 12,794,107 B2
(45) Date of Patent: Nov. 10, 2026

(54) VEHICULAR GLASS INTEGRATED WITH ANTENNA, MANUFACTURING METHOD, AND VEHICLE

(71) Applicant: FUYAO GLASS INDUSTRY GROUP CO., LTD., Fuqing City (CN)

(72) Inventor: Xiaqun Yu, Fuqing City (CN)

(73) Assignee: FUYAO GLASS INDUSTRY GROUP CO., LTD., Fuqing City (CN)

( * ) Notice: Subject to any disclaimer, the term of this patent is extended or adjusted under 35 U.S.C. 154(b) by 65 days.

(21) Appl. No.: 18/867,259

(22) PCT Filed: May 25, 2023

(86) PCT No.: PCT/CN2023/096378
§ 371 (c)(1),
(2) Date: Nov. 19, 2024

(87) PCT Pub. No.: WO2023/227078
PCT Pub. Date: Nov. 30, 2023

(65) Prior Publication Data

US 2025/0323408 A1 Oct. 16, 2025

(30) Foreign Application Priority Data

May 26, 2022 (CN) ......................... 202210581634.5

(51) Int. Cl.
*H01Q 1/32* (2006.01)
*H01Q 1/12* (2006.01)
(Continued)

(52) U.S. Cl.
CPC ............. *H01Q 1/1271* (2013.01); *H01Q 1/32* (2013.01); *H01Q 1/38* (2013.01); *H01Q 13/08* (2013.01)

(58) Field of Classification Search
CPC .......... H01Q 1/1271; H01Q 1/32; H01Q 1/38; H01Q 13/08
See application file for complete search history.

(56) References Cited

U.S. PATENT DOCUMENTS 6,097,345 A 8/2000 Walton
6,219,002 B1 4/2001 Lim
(Continued)

FOREIGN PATENT DOCUMENTS

CN 1049071 A 2/1991
CN 101286592 A 10/2008
(Continued)

OTHER PUBLICATIONS

First Office Action and search report issued on Dec. 28, 2022 for counterpart Chinese patent application No. 202210581634.5 with machine EN translation downloaded from EPO (20 pages).
(Continued)

*Primary Examiner* — Jimmy T Vu
(74) *Attorney, Agent, or Firm* — Nutter McClennen & Fish LLP

(57) ABSTRACT

A vehicular glass integrated with an antenna, a manufacturing method and a vehicle are disclosed in the present disclosure. The manufacturing method includes the steps of: preparing a first glass plate; laying a metal layer on a first surface of the first glass plate, and forming at least one ring groove on the metal layer to form an antenna radiation layer; and laying at least one feed microstrip line on a second surface of the first glass plate to form a feed network layer which performs a coupling feed to the antenna radiation layer, so that a radio frequency electromagnetic field is excited between the first glass plate and the antenna radiation layer.

16 Claims, 8 Drawing Sheets

(51) Int. Cl.
*H01Q 1/38* (2006.01)
*H01Q 13/08* (2006.01)

(56) References Cited

U.S. PATENT DOCUMENTS

| | | | | |
|---|---|---|---|---|
| 2003/0201941 | A1 | 10/2003 | Aikawa et al. | |
| 2005/0083239 | A1 | 4/2005 | Thudor et al. | |
| 2005/0195115 | A1 * | 9/2005 | Yegin | H01Q 9/0428 343/713 |
| 2006/0139223 | A1 | 6/2006 | Li et al. | |
| 2007/0052587 | A1 | 3/2007 | Cheng | |
| 2012/0098715 | A1 | 4/2012 | Dai | |
| 2012/0098716 | A1 | 4/2012 | Dai | |
| 2017/0346154 | A1 | 11/2017 | Kagaya | |

FOREIGN PATENT DOCUMENTS

| | | | | | |
|---|---|---|---|---|---|
| CN | 102790292 | A | | 11/2012 | |
| CN | 103794846 | A | | 5/2014 | |
| CN | 204361267 | U | * | 5/2015 | |
| CN | 108039576 | A | * | 5/2018 | H01Q 1/38 |
| CN | 209521514 | U | | 10/2019 | |
| CN | 111541006 | A | | 8/2020 | |
| CN | 112864577 | A | | 5/2021 | |
| CN | 112909490 | A | * | 6/2021 | H01Q 1/32 |
| CN | 214280196 | U | | 9/2021 | |
| CN | 214280203 | U | | 9/2021 | |
| CN | 114464990 | A | | 5/2022 | |
| CN | 114976597 | A | | 8/2022 | |
| EP | 3244481 | A1 | * | 11/2017 | H01Q 5/378 |
| JP | 2005124208 | A | | 5/2005 | |
| JP | 2006033652 | A | | 2/2006 | |
| JP | 2008526099 | A | | 7/2008 | |
| JP | 2017212553 | A | | 11/2017 | |
| JP | 2018014737 | A | | 1/2018 | |
| KR | 1020050037355 | A | | 4/2005 | |
| WO | 2015089823 | A1 | | 6/2015 | |
| WO | 2022101507 | A1 | | 5/2022 | |

OTHER PUBLICATIONS

International search report issued for counterpart Chinese patent application No. PCT/CN2023/096378 mailed on Aug. 14, 2023 (2 pages).
Minoru, I., et al., Downlink Performance Using Vehicle Glass Mounted Antenna for 28-GHz Band in High Mobility Environment, 2019 IEEE 89th Vehicular Technology Conference (VTC2019-Spring) (5 pages).
Peng, W. et al., Design of a UHF and S Band Satellite Communication Integrated Antenna, Ship Electronic Engineering, No. 5, dated May 2020 (6 pages).
Second Office Action and search report issued on Aug. 19, 2023 for counterpart Chinese patent application No. 202210581634.5 with machine EN translation downloaded from EPO (21 pages).
Sun D., et al., Research on Scanning Slotted Waveguide Array Antenna, Spacecraft Engineering, vol. 17 No. 6, dated Nov. 2008 (7 pages).
Supplemental search report issued on Jan. 25, 2024 for counterpart Chinese patent application No. 202210581634.5 with machine EN translation (6 pages).
Zhou B., et al., Design of wide-band aperture-stacked path microstrip antennas, Information Technology and Network Security, No. 2, dated Feb. 2018 (5 pages).
Second Office Action issued for corresponding Japanese Patent Application 2024-557236 mailed on Jan. 6, 2026.
First Office Action issued for corresponding Japanese Patent Application 2024-557236 mailed on Sep. 2, 2025 (8 pages).
Notice for grant issued for corresponding Japanese Patent Application 2024-557236 mailed on Apr. 21, 2026 (5 pages).

* cited by examiner

VEHICULAR GLASS INTEGRATED WITH ANTENNA, MANUFACTURING METHOD, AND VEHICLE

CROSS REFERENCE TO RELATED APPLICATION

This application is a National Stage of International Application No. PCT/CN2023/096378, filed May 25, 2023, which claims priority to Chinese Patent Application No. 202210581634.5, filed on May 26, 2022, each of which are hereby incorporated by reference in their entireties.

TECHNICAL FIELD

The present disclosure relates to the technical field of vehicular glass, and particularly to a vehicular glass integrated with an antenna, a manufacturing method, and a vehicle.

BACKGROUND

The GNSS antenna is an indispensable part of a satellite positioning system. The existing GNSS antennas generally use high-dielectric constant ceramics or PCB materials as substrates, and in order to achieve multi-band frequencies, adopt a multi-layer stacking mode. In addition, different frequency bands are excited using independent feeding modes, respectively. Finally, an antenna with a certain thickness is designed.

With the development of the Internet of Vehicles (IOV) technologies, the vehicle navigation, monitoring, alarm, dispatching and collection based on position information have increasingly higher requirements for the position accuracy. Meanwhile, with the rise of Internet vehicles, new applications such as vehicle calling, information release, electronic stop board, vehicle logistics, etc. have also emerged. In addition, due to the requirements of the design of new vehicles for the appearance beautification and the application of the multi-communication and positioning system, the antenna has almost no mounting position and space outside the vehicle body, so the antenna has been transferred to the interior of any new vehicle. On the one hand, the performance of the antenna is completely deteriorated, and the mounting position of the antenna is varied for different vehicle models, which may have completely different effects on the antenna. On the other hand, since such antenna should meet specific performance requirements, and in order to protect all its body parts as a whole, a protective housing is externally provided, resulting in a large size and a heavy weight, which limits the position layout of the antenna in the vehicle. Moreover, since the antenna is usually mounted by being externally adhered on the glass, when there is a certain acceleration or in case of a gravity-receiving and accelerated state for a long time, a great stress will be exerted on the glass, and the glass will be damaged due to a stress accumulation.

SUMMARY

The present disclosure aims to provide a vehicular glass integrated with an antenna and a manufacturing method thereof, so as to solve the technical problems that at present, the mounting position of an antenna on a vehicle is limited, and the glass will be damaged if the antenna is fixed on the glass by external adhering.

The above objective of the present disclosure can be achieved by adopting the following technical solutions:

The present disclosure provides a manufacturing method of a vehicular glass integrated with an antenna, including the steps of: preparing a first glass plate; laying a metal layer on a first surface of the first glass plate, and forming at least one ring groove on the metal layer to form an antenna radiation layer; and laying at least one feed microstrip line on a second surface of the first glass plate to form a feed network layer which performs a coupling feed to the antenna radiation layer, so that a radio frequency electromagnetic field is excited between the first glass plate and the antenna radiation layer.

The present disclosure further provides a vehicular glass integrated with an antenna, comprising: a first glass plate having a first surface and a second surface; an antenna radiation layer, comprising a metal layer which is laid on the first surface of the first glass plate and formed with at least one ring groove; and a feed network layer, including at least one feed microstrip line which is laid on the second surface of the first glass plate; in which the feed network layer performs a coupling feed to the antenna radiation layer, so that a radio frequency electromagnetic field is excited between the first glass plate and the antenna radiation layer.

The present disclosure further provides a vehicle, including the vehicular glass integrated with the antenna.

The advantageous effects of the present disclosure at least include:

According to the vehicular glass integrated with the antenna and the manufacturing method in the present disclosure, the antenna radiation layer is formed on the first surface of the first glass plate and the feed network layer is formed on the second surface of the first glass plate, and then the feed network layer performs a coupling feed to the antenna radiation layer, which causes a radio frequency electromagnetic field to be excited between the first glass plate and the antenna radiation layer, so that the vehicular glass has the performance of the antenna, thereby avoiding the problem that the vehicular glass is easy to be damaged due to a local stress concentration of the vehicular glass caused by an antenna structure in a travelling state of the vehicle when the antenna structure is mounted on the vehicular glass, and avoiding the problem that the original performance of the antenna is deteriorated so that the antenna cannot work normally because the antenna is shielded by the glass or other materials after being mounted on the vehicle, or the performance of the antenna is unstable due to a limited mounting space of the antenna on the vehicle, without damaging the structure of the first glass plate, so that the structural strength of the first glass plate will not be affected. In addition, since the performance of the antenna of the vehicular glass of the present disclosure is designed based on the structure of the first glass plate, the present disclosure is applicable to the vehicles of various models.

BRIEF DESCRIPTION OF THE DRAWINGS

In order to explain the technical solutions in the embodiments of the present disclosure more clearly, the drawings required for describing the embodiments will be briefly introduced as follows. Obviously, the drawings involved in the following description merely illustrate some embodiments of the present disclosure, and persons of ordinary skill in the art can obtain other drawings from these drawings without paying any creative effort.

Figure 1:
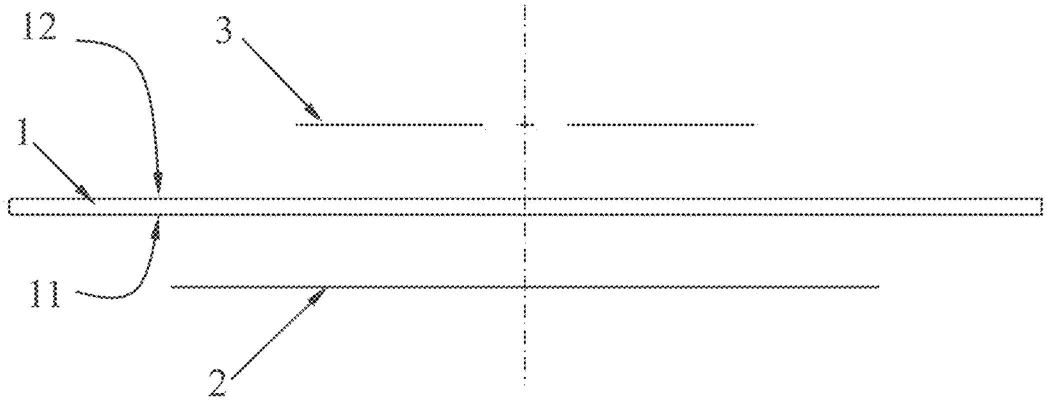
FIG. 1 illustrates an exploded view of a vehicular glass integrated with an antenna (according to a first embodiment) of the present disclosure.

In which,

1: first glass plate; 11: first surface; 12: second surface; 2: antenna radiation layer; 21: metal layer; 22: ring groove; 221: inner ring groove; 222: outer ring groove; 24: recess; 241: first inner recess; 242: second inner recess; 243: first outer recess; 244: second outer recess; 25: protrusion; 251: first inner protrusion; 252: first outer protrusion; 253: second outer protrusion; 3: feed network layer; 31: feed microstrip line; 4: second glass plate; 5: reflecting plate.

DETAILED DESCRIPTION OF THE PREFERRED EMBODIMENTS

The technical solutions of the embodiments of the present disclosure will be clearly and completely described below with reference to the drawings for the embodiments of the present disclosure. Obviously, those described are only a part, rather than all, of the embodiments of the present disclosure. Based on the embodiments of the present disclosure, any other embodiment obtained by persons of ordinary skill in the art without paying any creative effort should fall within the protection scope of the present disclosure.

Embodiment 1

As illustrated in FIGS. 1, 2, 3 and 4, the present disclosure provides a manufacturing method of a vehicular glass integrated with an antenna, including the steps of: preparing a first glass plate 1; laying a metal layer 21 on a first surface 11 of the first glass plate 1, and forming at least one ring groove 22 on the metal layer 21 to form an antenna radiation layer 2; and laying at least one feed microstrip line 31 on a second surface 12 of the first glass plate 1 to form a feed network layer 3 which performs a coupling feed to the antenna radiation layer 2, so that a radio frequency electromagnetic field is excited between the first glass plate 1 and the antenna radiation layer 2.

According to the manufacturing method of the vehicular glass integrated with the antenna of the present disclosure, the antenna radiation layer 2 is formed on the first surface 11 of the first glass plate 1 and the feed network layer 3 is formed on the second surface 12 of the first glass plate 1, and then the feed network layer 3 performs a coupling feed to the antenna radiation layer 2, which causes a radio frequency electromagnetic field to be excited between the first glass plate 1 and the antenna radiation layer 2, so that the vehicular glass has the performance of the antenna, thereby avoiding the problem that the vehicular glass is easy to be damaged due to a local stress concentration of the vehicular glass caused by an antenna structure in a travelling state of the vehicle when the antenna structure is mounted on the vehicular glass, avoiding the problem that the performance of the antenna structure is unstable due to a limited mounting space of the antenna structure on the vehicle, preventing the structure of the first glass plate 1 from being damaged, and preventing the structural strength of the first glass plate 1 from being affected. In addition, since the performance of the antenna of the vehicular glass of the present disclosure is designed based on the structure of the first glass plate 1, the present disclosure is applicable to the vehicles of various models.

Specifically, the −10 dB impedance bandwidth of the antenna radiation layer 2 on the vehicular glass of the present disclosure can cover 1.164 GHz to 1.589 GHz, so that signals in a frequency range of 1140 MHz to 1320 MHz and a frequency range of 1540 MHz to 1620 MHz covered by the satellite positioning system can be received by utilizing the performance of the antenna of the vehicular glass of the present disclosure. Optionally, the present disclosure can also be applied to other wireless communication systems by adjusting the working bandwidth of the antenna radiation layer.

Figure 3:
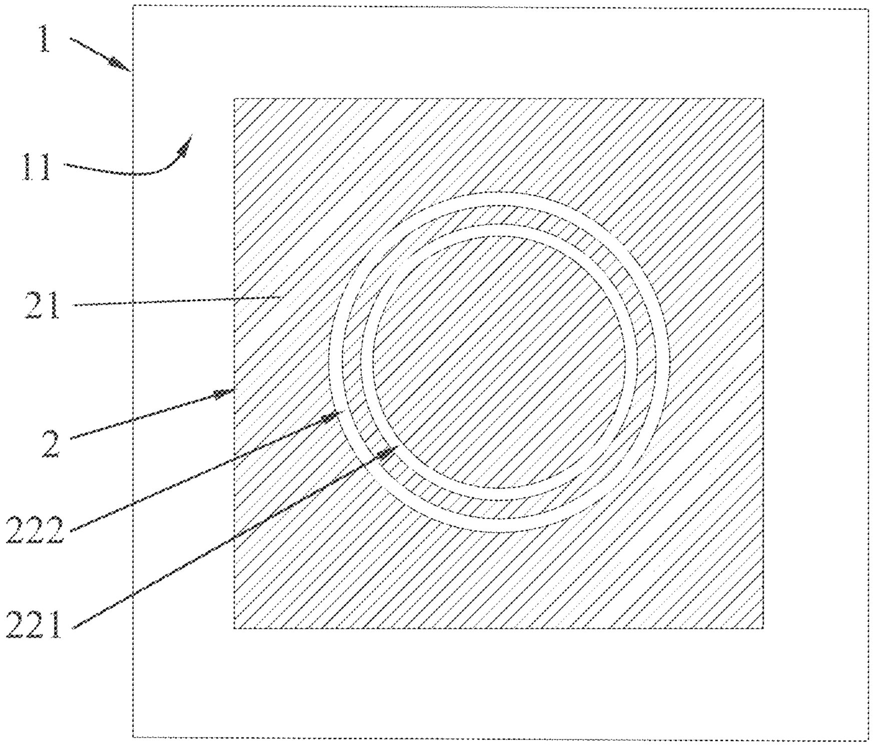
FIG. 3 illustrates a structural diagram of a first surface of a first glass plate of the present disclosure.

As illustrated in FIG. 3, in the embodiment of the present disclosure, the formation of the antenna radiation layer 2 is integrated with the molding process of the vehicular glass, including the steps of: forming the metal layer 21 on the first surface 11 of the first glass plate 1 by printing; and forming an inner ring groove 221 for excitation of a high frequency and an outer ring groove 222 for excitation of a low frequency, which are concentrically arranged from inside to outside, on the metal layer 21 by etching. In this embodiment, by directly printing the metal layer 21 on the first surface 11 of the first glass plate 1, the direct bonding between the metal layer 21 and the first glass plate 1 is ensured to be stable, thereby ensuring the stable performance of the antenna. By feeding the antenna radiation layer 2 through the feed network layer 3, energy is coupled to the outer ring groove 222 to form a low-frequency resonance point, so as to receive the signals in the low-frequency band, and energy is also coupled to the inner ring groove 221 to form a high-frequency resonance point, so as to receive the signals in the high-frequency band. Therefore, the vehicular glass integrated with the antenna of the present disclosure has the performance of a dual-frequency antenna, and it is possible to control the high-frequency resonance frequency and the low-frequency resonance frequency, as well as the isolation therebetween, respectively, by controlling the size of the inner ring groove 221 and the size of the outer ring groove 222. In addition, by forming the inner ring groove 221 and the outer ring groove 222 on the metal layer 21 by etching, it is possible to ensure that the first glass plate 1 will not be damaged in the process of forming the grooves. Specifically, the metal layer 21 is formed by printing silver paste on the first surface 11 of the first glass plate 1. Optionally, the metal layer is a metal sheet attached to the first surface of the first glass plate. Optionally, the metal layer is made of copper, aluminum, or gold. Optionally, the metal layer is formed on the first surface of the first glass plate by means of electroplating. Optionally, the inner ring groove and the outer ring groove are formed on the metal layer by means of cutting.

As illustrated in FIG. 3, in the embodiment of the present disclosure, a dielectric constant of the first glass plate 1 is determined according to a thickness of the first glass plate 1; a medium wavelength of electromagnetic waves propagating in the first glass plate 1 is determined according to the dielectric constant of the first glass plate 1 and a frequency range to be covered by the antenna radiation layer 2; inner and outer diameters of the inner ring groove 221 and inner and outer diameters of the outer ring groove 222 are determined according to the medium wavelength. The sizes of the inner ring groove 221 and the outer ring groove 222 are designed based on the thickness and the dielectric constant of the first glass plate 1, so that the frequency range covered by the antenna radiation layer meets the requirements. Therefore, the vehicular glass integrated with the antenna can be made for different vehicle models or different positions.

Specifically, the calculation formula of the medium wavelength is $$\lambda = \frac{C}{f} \text{ and } \lambda_r = \frac{\lambda}{\sqrt{\varepsilon_r}},$$

where c denotes a propagation speed of electromagnetic waves in free space, f denotes a frequency of electromagnetic waves, λ denotes a propagation wavelength of electromagnetic waves in free space, $\lambda_r$ denotes a medium wavelength, and $\varepsilon_r$ denotes a dielectric constant of the first glass plate 1 (related to the thickness of the first glass plate 1). In this embodiment, the thickness of the first glass plate 1 is 2.1 mm. The dielectric constant of the first glass plate 1 is 6.7. An impedance bandwidth need to be covered by antenna radiation layer 2 is 1.164 GHz to 1.589 GHz, and a frequency range to be covered by antenna radiation layer 2 is 1165 MHz to 1300 MHz for low frequency, 1520 MHz to 1660 MHz for high frequency and 1.375 GHz for center frequency. The medium wavelength of the electromagnetic wave propagating in the first glass plate 1 is 84.3 mm.

The medium wavelength is λ, the outer diameter of the inner ring groove 221 is $0.17\lambda_r$ to $0.19\lambda_r$, the inner diameter of the inner ring groove 221 is $0.15\lambda_r$ to $0.17\lambda_r$, the outer ring groove 222 is $0.21\lambda_r$ to $0.23\lambda_r$, and the inner diameter of the outer ring groove 222 is $0.19\lambda_r$ to 0.214. Exemplarily, the outer diameter of the inner ring groove 221 is 14.78 mm. The inner diameter of the inner ring groove 221 is 12.7 mm. The outer diameter of the outer ring groove 222 is 20.33 mm. The inner diameter of the outer ring groove 222 is 16.99 mm. In addition, the length and the width of the metal layer 21 have little influence on the performance of the antenna, and an appropriate length and width can be selected according to the size of the first glass plate 1. In this embodiment, the length and the width of the metal coating 21 are both 96 mm.

Figure 4:
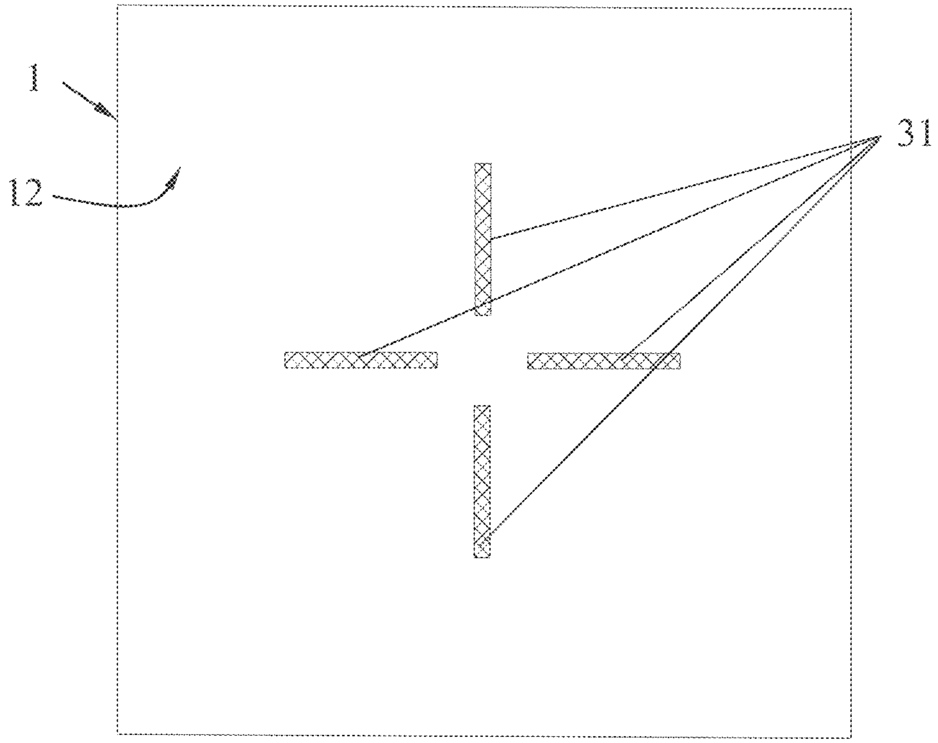
FIG. 4 illustrates a structural diagram of a second surface of a first glass plate of the present disclosure.

As illustrated in FIG. 4, in the embodiment of the present disclosure, four of the feed microstrip lines 31 are uniformly formed on the second surface 12 of the first glass plate 1 along a circumferential direction of the inner ring groove 221 and the outer ring groove 222, and the feed microstrip lines 31 are disposed along a radial direction of the inner ring groove 221 and the outer ring groove 222, so as to perform a coupling feed to the antenna radiation layer 2 through the four feed microstrip lines 31. A phase difference among the feed positions of the four feed microstrip lines 31 is 90 degrees, thereby realizing right-handed circular polarization with a high phase precision and a good stability.

Specifically, the feed microstrip line uses a short-circuited transmission line with a characteristic impedance of 50Ω. Optionally, the feed network layer employs two feed microstrip lines disposed oppositely for coupling feed. Optionally, the feed network layer utilizes only one feed microstrip line for coupling feed.

The feed microstrip line 31 has a length of $0.12\lambda_r$ to $0.14\lambda_r$, and a width of $0.02\lambda_r$ to $0.04\lambda_r$. As the length of the feed microstrip line 31 increases, both the high frequency band and the low frequency band of the antenna radiation layer 2 move to the low frequency, and the bandwidth increases. Exemplarily, the feed microstrip line 31 has a length of 20 mm and a width of 2.3 mm.

In this embodiment, the vehicular glass has a single-layer glass structure.

Figure 5:
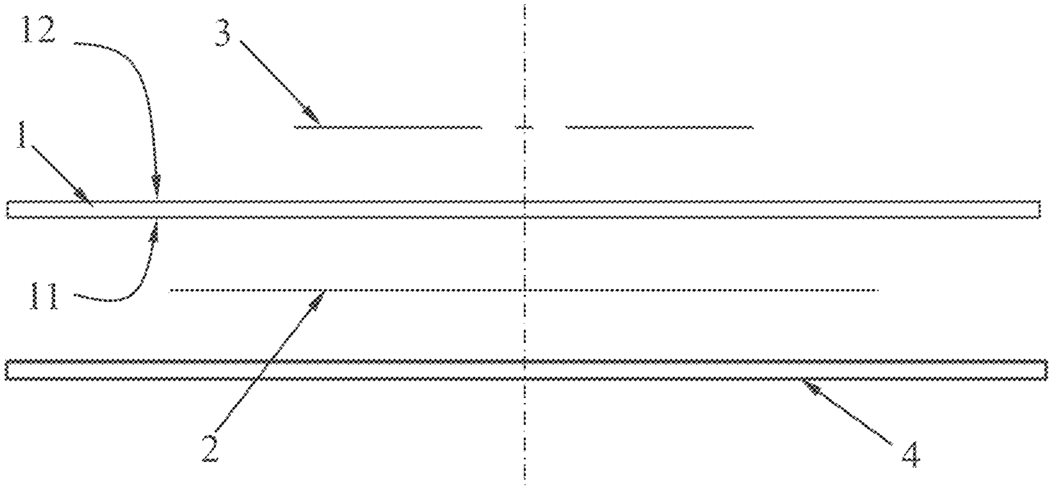
FIG. 5 illustrates an exploded view of a vehicular glass integrated with an antenna according to a second embodiment of the present disclosure.

As illustrated in FIG. 5, in a second embodiment, the manufacturing method further includes the step of: preparing a second glass plate 4, and adhering and fixing the second glass plate 4 on the first surface 11 of the first glass plate 1, so that the antenna radiation layer 2 is located between the first glass plate 1 and the second glass plate 4. The first glass plate 1 is an inner-layer glass plate disposed towards the interior of the vehicle, and the second glass plate 4 is an outer-layer glass plate disposed toward the exterior of the vehicle. In this embodiment, the vehicular glass is a double-layer glass structure, and by adhering and fixing the second glass plate 4 on the first surface 11 of the first glass plate 1 and covering the antenna radiation layer 2, the main structure of the vehicular glass will not be affected, while the antenna radiation layer 2 can be protected by the second glass plate 4, thereby improving the stability of the performance of the antenna of the vehicular glass of the present disclosure. Optionally, a protective cover is disposed on the first surface of the first glass plate to protect the antenna radiation layer.

Figure 6:
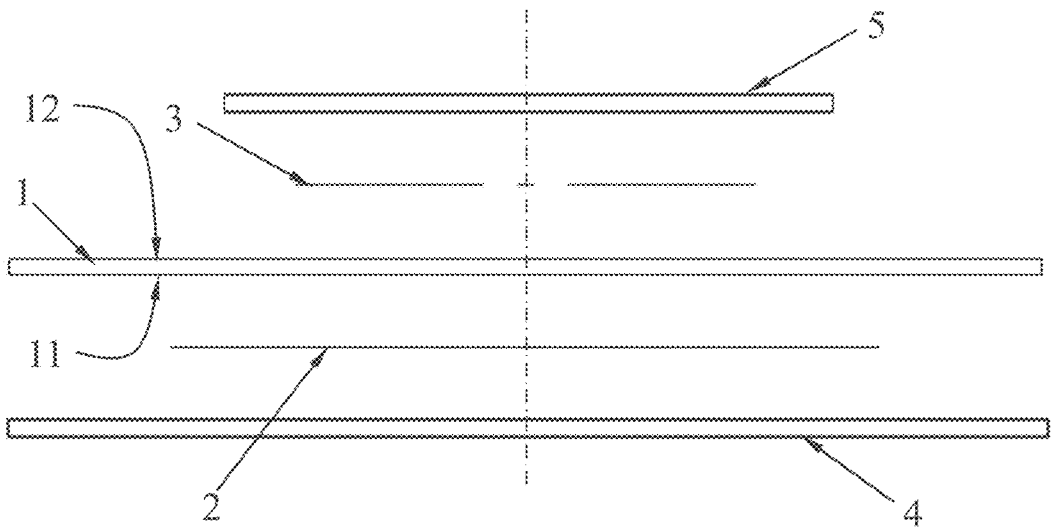
FIG. 6 illustrates an exploded view of a vehicular glass integrated with an antenna according to a third embodiment of the present disclosure.

As illustrated in FIG. 6, in a third embodiment, the manufacturing method further includes the step of: adhering and fixing a reflecting plate 5 on the second surface 12 of the first glass plate 1, and locating the feed network layer 3 in a reflecting cavity of the reflecting plate 5. By adding the reflecting plate 5, the electromagnetic wave radiated by the antenna radiation layer 2 is inclined at a specific angle to directionally radiate energy, and one side of the antenna radiation layer 2 can be shielded by the reflecting plate 5. In addition, a plurality of the feed microstrip lines 31 may be further fixed by the reflecting plate 5. Specifically, the reflection plate 5 has a thickness not more than 10 mm, so that it is light in weight and more beautiful.

Figure 7:
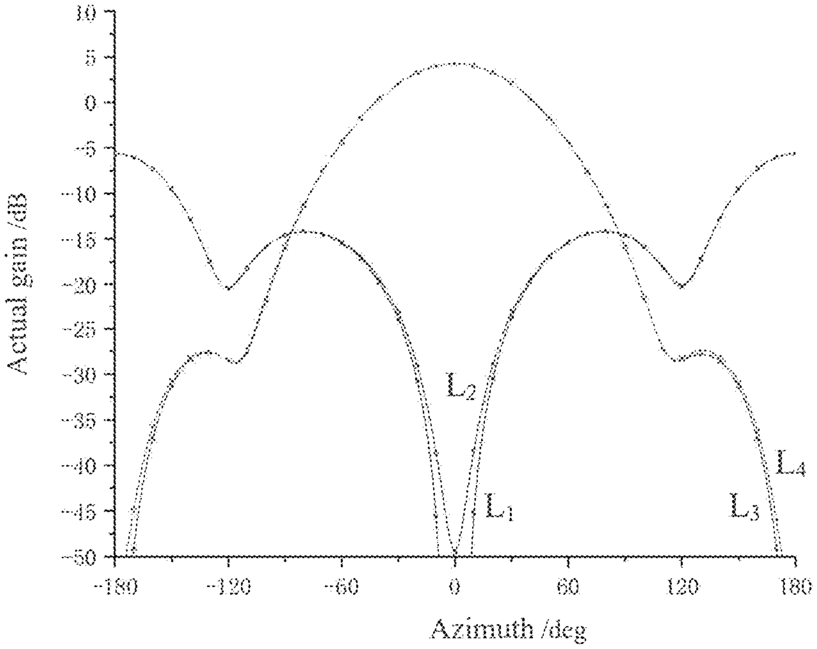
FIG. 7 illustrates an antenna far-field pattern at 1.19 GHz of a vehicular glass integrated with an antenna of the present disclosure.
Figure 8:
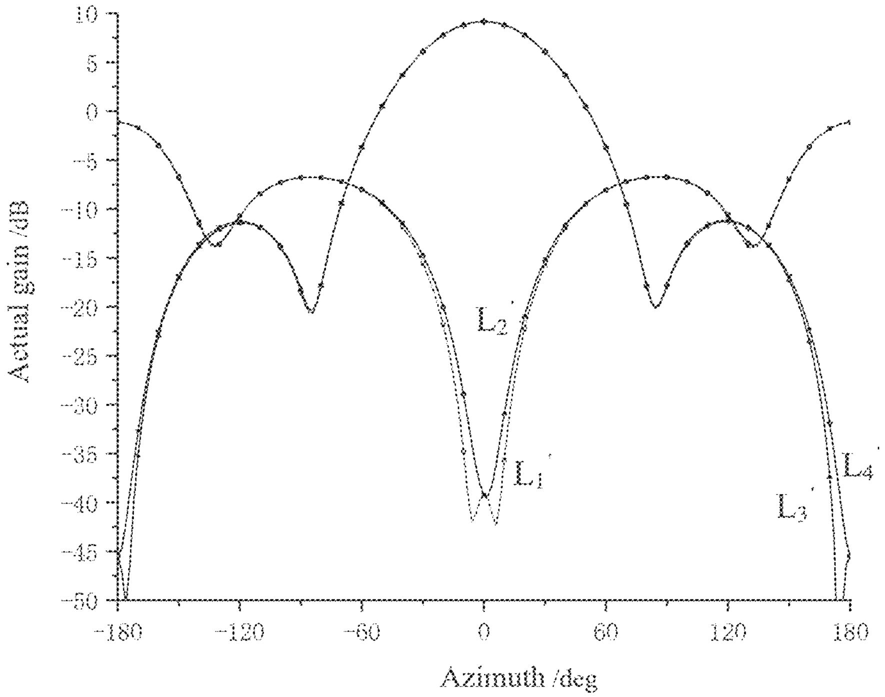
FIG. 8 illustrates an antenna far-field pattern at 1.57 GHz of a vehicular glass integrated with an antenna of the present disclosure.
Figure 9:
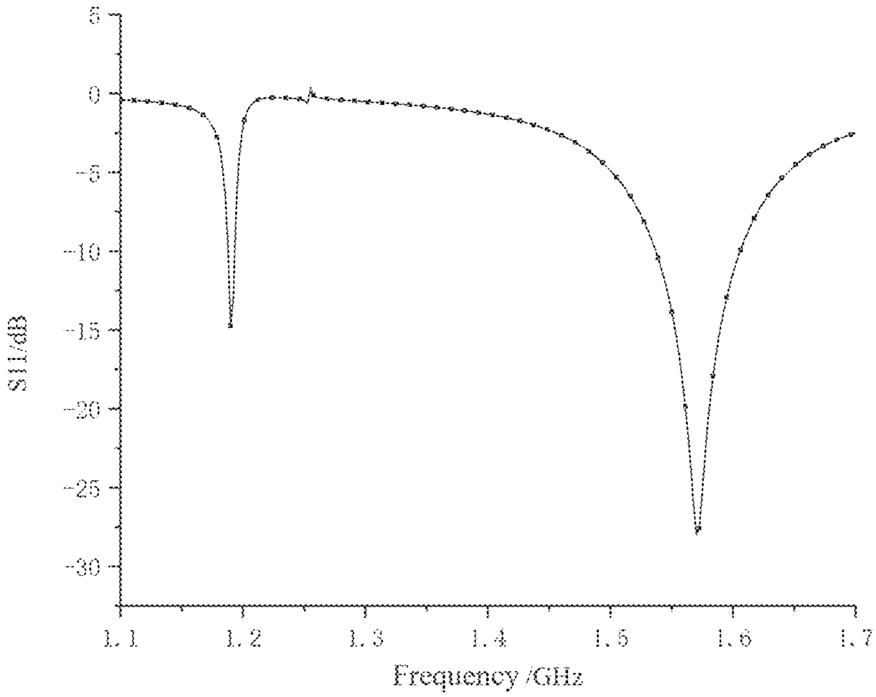
FIG. 9 illustrates a simulation result of an antenna return loss (S11) of a vehicular glass integrated with an antenna of the present disclosure.

In FIGS. 7 and 8, curve $L_1$ shows a left-handed circular polarization gain of φ=0°, curve $L_2$ shows a left-handed circular polarization gain of φ=90°, curve $L_3$ shows a right-handed circular polarization gain of φ=0°, and curve $L_4$ shows a right-handed circular polarization gain of φ=90°. In conjunction with FIG. 9, it can be seen that the vehicular glass of the present disclosure has the following antenna performances: at 1.19 GHz, the maximum gain is 4.2 dB and S11 (return loss) is −13.9 dB. At 1.57 GHz, the maximum gain is 9.1 dB, and S11 (return loss) is −27.7 dB.

Embodiment 2

As illustrated in FIG. 1, the present disclosure further provides a vehicular glass integrated with an antenna, which is made using a manufacturing method of the vehicular glass integrated with the antenna. The manufacturing method in this embodiment is the same as that in Embodiment 1 in terms of the specific steps and the working principle, and the details will not be repeated here.

As illustrated in FIG. 1, in the embodiment of the present disclosure, in a state that the first glass plate 1 is mounted on a vehicle body, the first surface 11 of the first glass plate 1 is disposed towards an exterior of a vehicle, and the second surface 12 of the first glass plate 1 is disposed towards an interior of the vehicle, which is convenient to electrically connect the feed network layer 3 with a receiving module in the vehicle, and also convenient for the antenna radiation layer 2 to receive signals.

Figure 2:
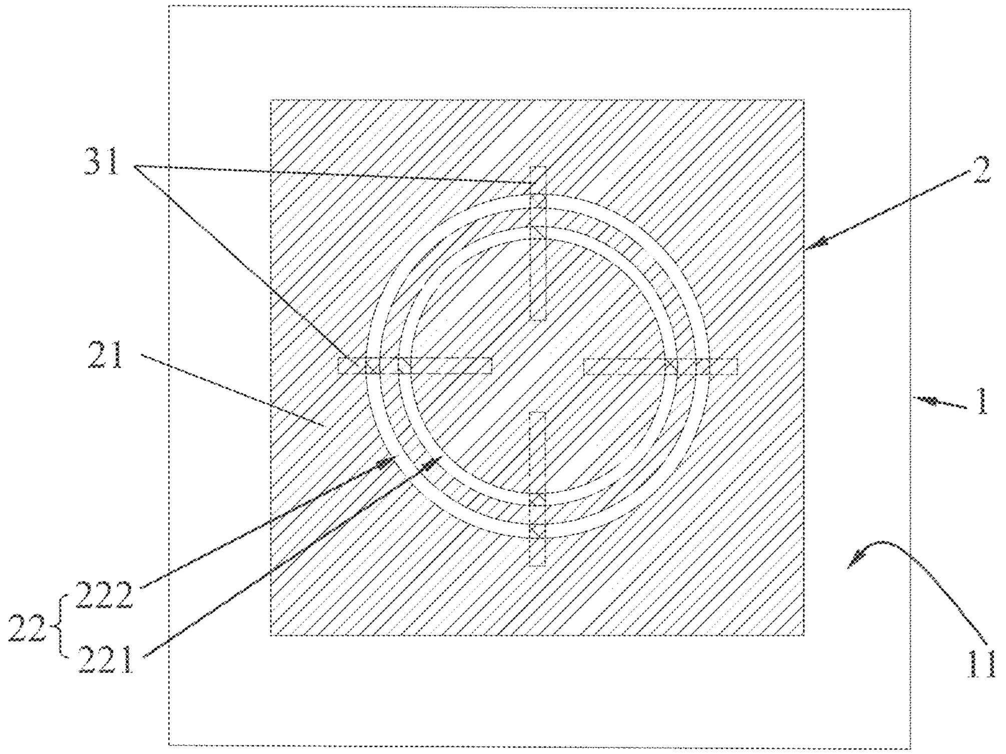
FIG. 2 illustrates a top view of a vehicular glass integrated with an antenna of the present disclosure.
Figure 10:
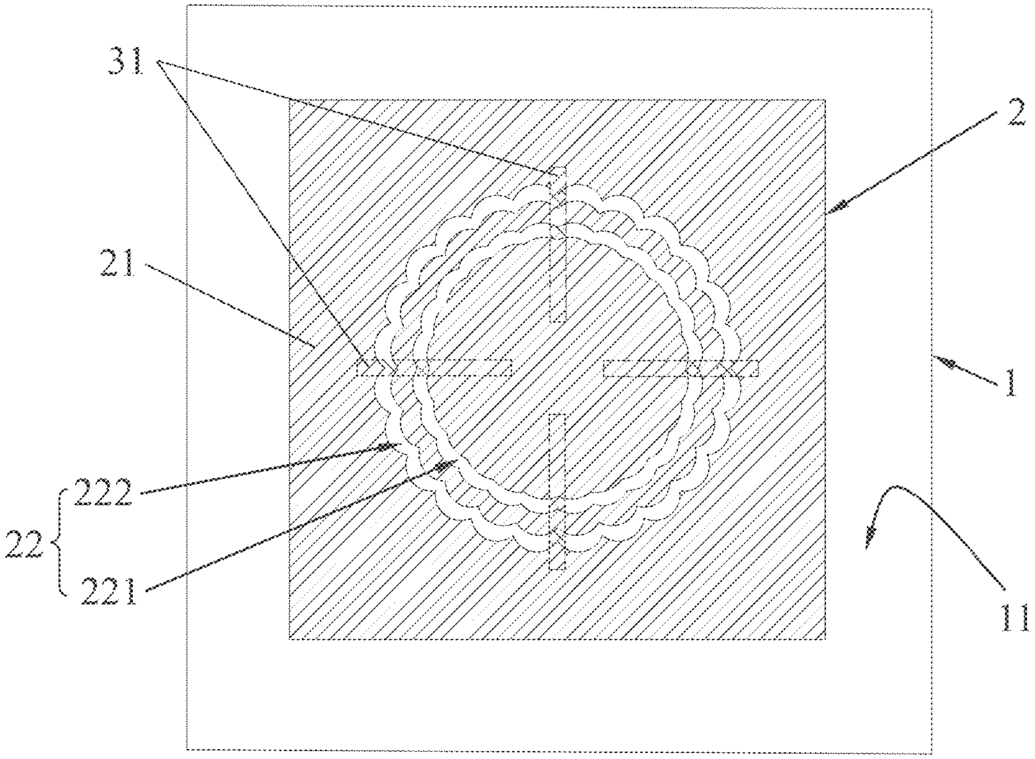
FIG. 10 illustrates a top view of a vehicular glass integrated with an antenna according to a fourth embodiment.
Figure 11:
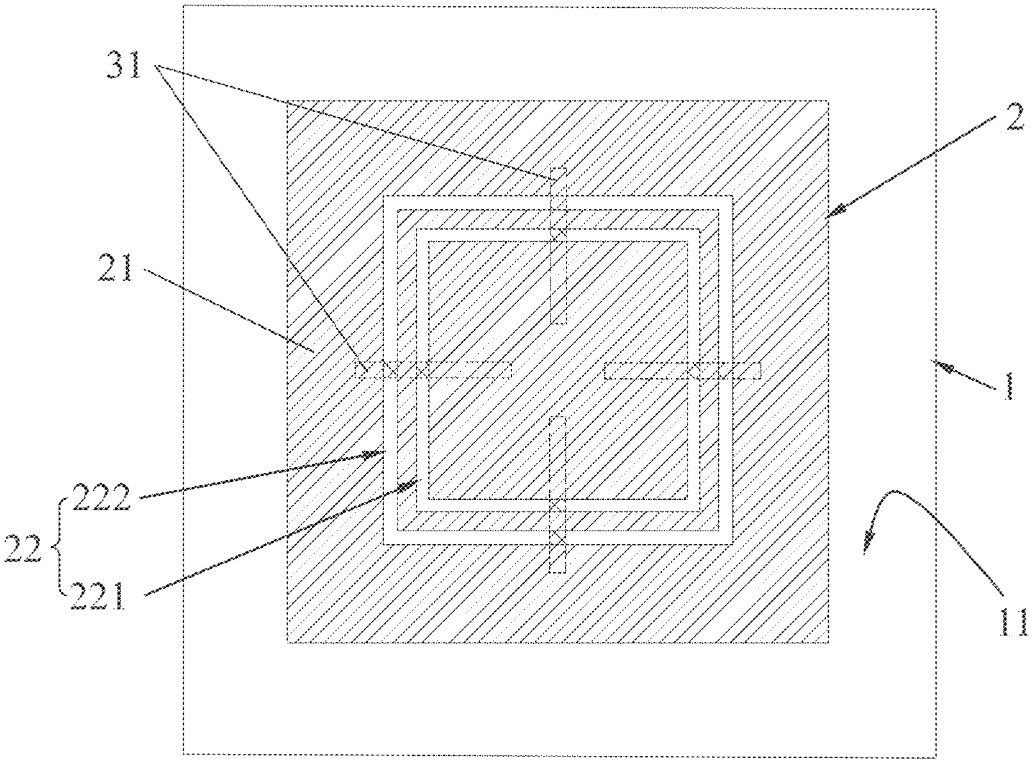
FIG. 11 illustrates a top view of a vehicular glass integrated with an antenna according to a fifth embodiment.

As illustrated in FIGS. 2, 10 and 11, the ring groove 22 has a circular shape, a square shape and a wavy shape. Each of the three shapes can achieve the circular polarization performance. According to the layout space on the first glass plate 1, an appropriate shape is selected to design the antenna radiation layer 2. Optionally, the ring groove has a shape of any combination of the circular shape, the square shape and the wavy shape.

As illustrated in FIG. 2, in this embodiment, the inner ring groove 221 and the outer ring groove 222 both have a circular shape.

As illustrated in FIG. 10, in a fourth embodiment, the inner ring groove 221 and the outer ring groove 222 both have a wavy shape, i.e., a wavy ring formed by two wavy lines.

As illustrated in FIG. 11, in a fifth embodiment, both the inner ring groove 221 and the outer ring groove 222 have a square shape.

As illustrated in FIGS. 12, 13, 14 and 15, the metal layer 21 is provided with at least one recess 24 and/or at least one protrusion 25, which is located at a feed position of at least one feed microstrip line 31. An inner annular surface of the ring groove 22 is recessed inwards along a radial direction of the inner annular surface to form the at least one recess 24, or the inner annular surface of the ring groove 22 is protruded outwards along the radial direction of the inner annular surface to form at the least one protrusion 25; and/or an outer annular surface of the ring groove 22 is recessed outwards along the radial direction of the outer annular surface to form the at least one recess 24, or the outer annular surface of the ring groove 22 is protruded inwards along the radial direction of the outer annular surface to form the at least one protrusion 25. By disposing one recess 24 or one protrusion 25 at the feed position, a current path of the ring groove 22 is changed, thereby adjusting the impedance bandwidth of the antenna radiation layer 2.

Specifically, a first adjustment mode is that the inner annular surface of the inner ring groove 221 is recessed inwards along the radial direction thereof to form at least one first inner recess 241, or the inner annular surface of the inner ring groove 221 is protruded outwards along the radial direction of the inner annular surface to form at least one first outer protrusion 252. A second adjustment mode is that the outer annular surface of the inner ring groove 221 is recessed outwards along the radial direction thereof to form at least one first outer recess 243, or the outer annular surface of the inner ring groove 221 is protruded inwards along the radial direction of the outer annular surface to form at least one first inner protrusion 251. A third adjustment mode is that the inner annular surface of the outer ring groove 222 is recessed inwards along the radial direction of the inner annular surface to form at least one second inner recess 242, or the inner annular surface of the outer ring groove 222 is protruded outwards along the radial direction of the inner annular surface to form at least one second protrusion 253. A fourth adjustment mode is that the outer annular surface of the outer ring groove 222 is recessed outwards along the radial direction of the outer annular surface to form at least one second outer recess 244. Among the above four adjustment methods, any one of the first two may be selected and combined with any one of the last two, without specific limitations as long as the impedance bandwidth of the antenna radiation layer 2 can be adjusted to meet the requirements.

Figure 12:
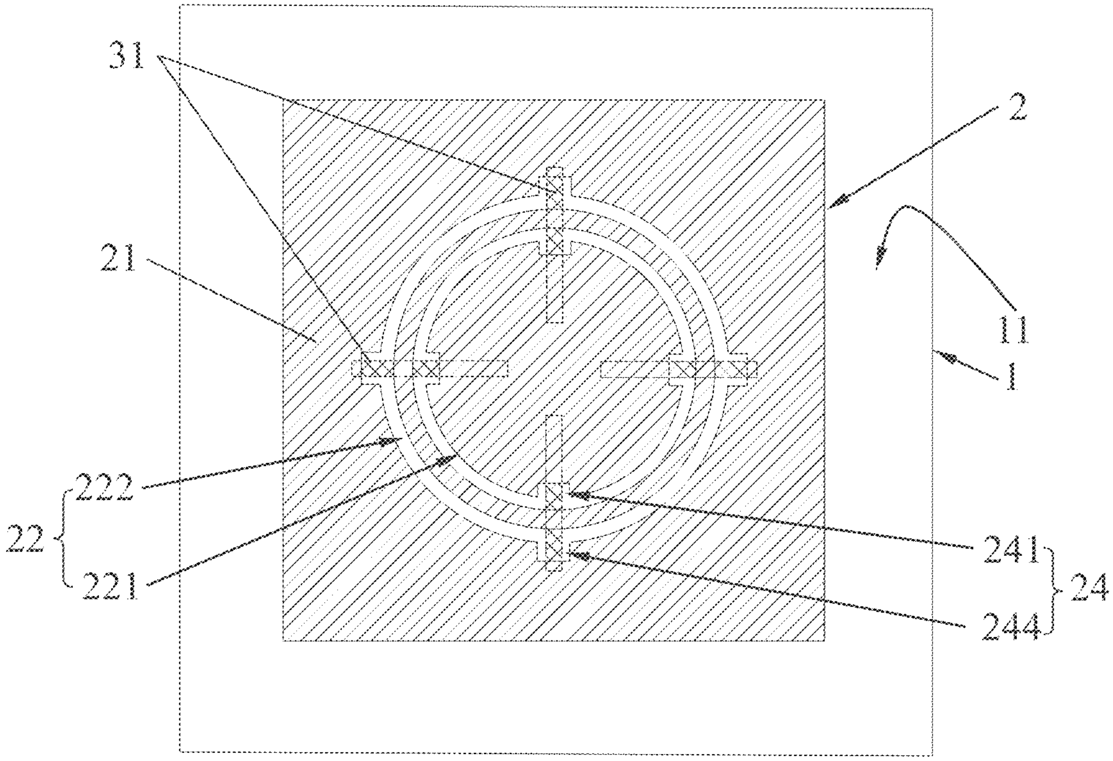
FIG. 12 illustrates a top view of a vehicular glass integrated with an antenna according to a sixth embodiment.

As illustrated in FIG. 12, in a sixth embodiment, the metal layer 21 is provided with four second outer recesses 244 and four first inner recesses 241.

Figure 13:
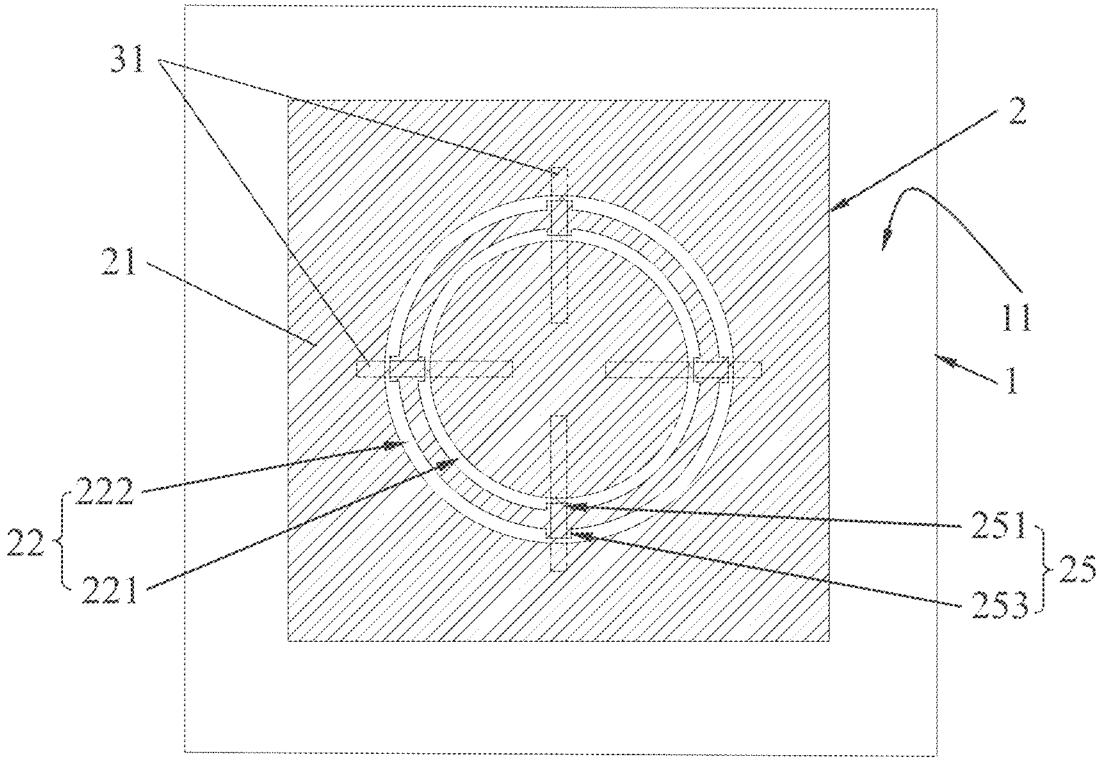
FIG. 13 illustrates a top view of a vehicular glass integrated with an antenna according to a seventh embodiment.

As illustrated in FIG. 13, in a seventh embodiment, the metal layer 21 is provided with four first inner protrusions 251 and four second outer protrusions 253.

Figure 14:
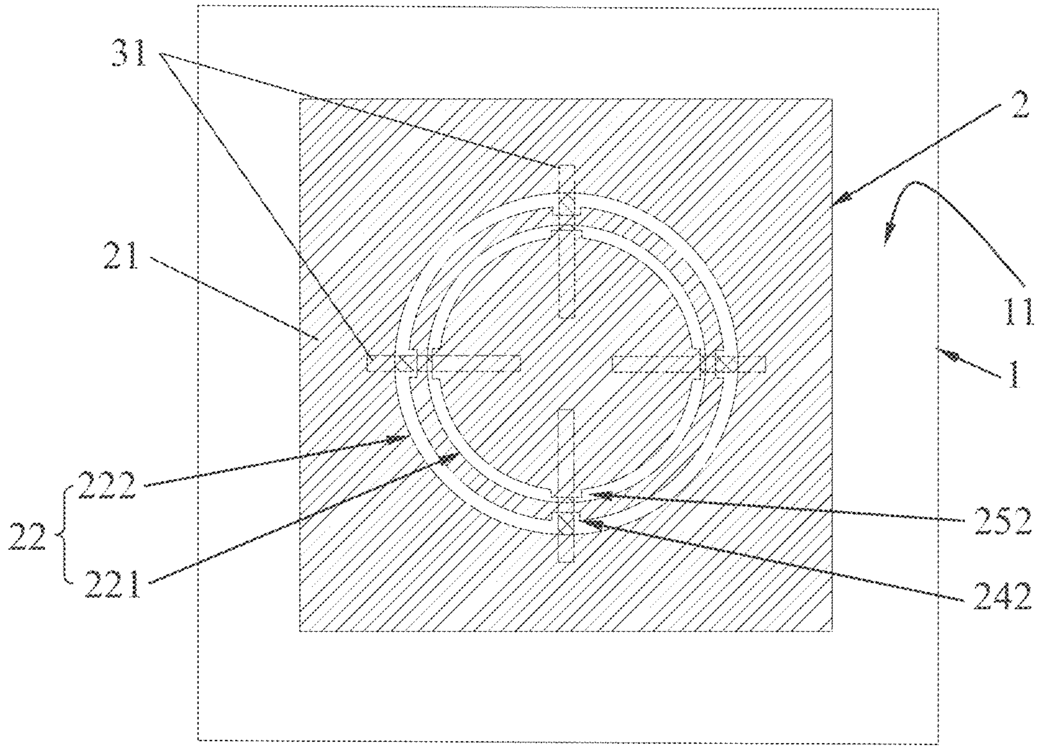
FIG. 14 illustrates a top view of a vehicular glass integrated with an antenna according to an eighth embodiment.

As illustrated in FIG. 14, in an eighth embodiment, the metal layer 21 is provided with four first protrusions 252 and four second inner grooves 242.

Figure 15:
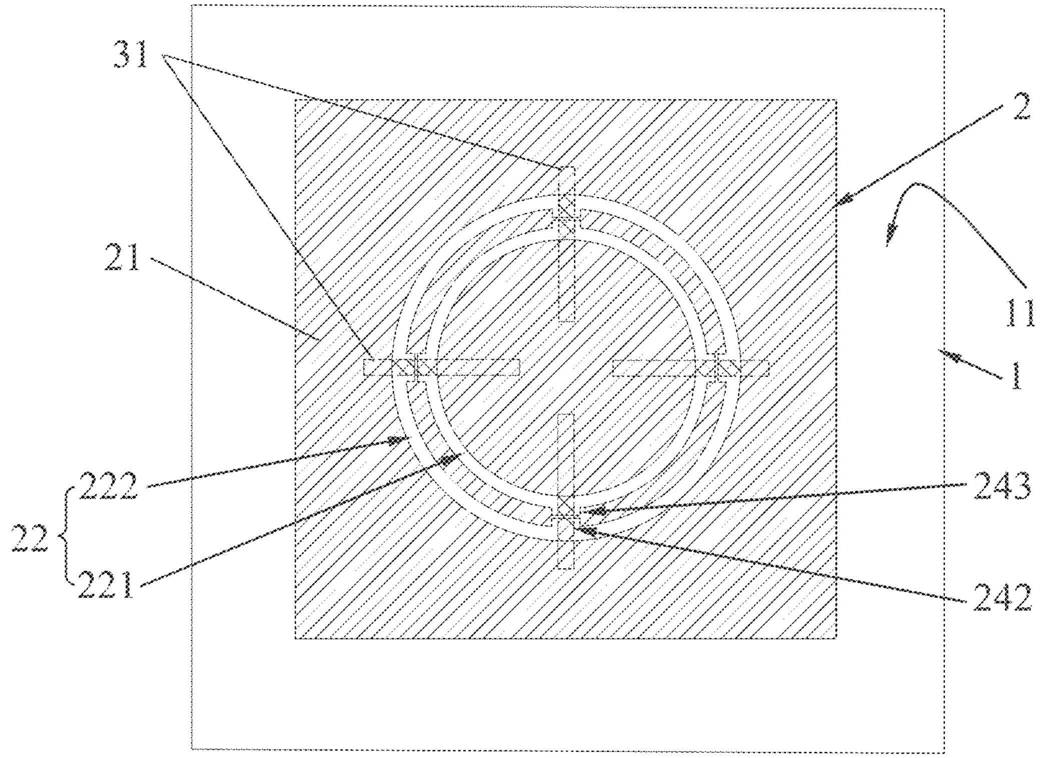
FIG. 15 illustrates a top view of a vehicular glass integrated with an antenna according to a ninth embodiment.

As illustrated in FIG. 15, in a ninth embodiment, the metal layer 21 is provided with four first outer recesses 243 and four second inner recesses 242.

Embodiment 3

The present disclosure further provides a vehicle, including a vehicular glass integrated with an antenna. The vehicular glass in this embodiment is the same as that in the second embodiment in terms of the specific structure and the working principle, and the details will not be repeated here.

Those described above are only a few embodiments of the present disclosure, and persons skilled in the art can make various modifications or variations to the embodiments of the present disclosure according to the contents disclosed in the application documents without departing from the spirit and scope of the present disclosure.

What is claimed is:

1. A manufacturing method of a vehicular glass integrated with an antenna, wherein comprising the steps of:

preparing a first glass plate;

laying a metal layer on a first surface of the first glass plate, and forming at least one ring groove on the metal layer to form an antenna radiation layer; and laying at least one feed microstrip line on a second surface of the first glass plate to form a feed network layer which performs a coupling feed to the antenna radiation layer, so that a radio frequency electromagnetic field is excited between the first glass plate and the antenna radiation layer, wherein the forming an antenna radiation layer comprises:

forming the metal layer on the first surface of the first glass plate;

forming an inner ring groove for excitation of a high frequency and an outer ring groove for excitation of a low frequency, which are concentrically arranged from inside to outside, on the metal layer, wherein a dielectric constant of the first glass plate is determined based on a thickness of the first glass plate;

a medium wavelength of electromagnetic waves propagating in the first glass plate is determined based on the dielectric constant of the first glass plate and a frequency range to be covered by the antenna radiation layer; and inner diameters and outer diameters of the inner ring groove and inner diameters and outer diameters of the outer ring groove are determined based on the medium wavelength.

2. The manufacturing method of the vehicular glass integrated with the antenna according to claim 1, wherein, the low frequency has a range of 1165 MHz to 1300 MHz, and the high frequency has a range of 1520 MHz to 1660 MHz.

3. The manufacturing method of the vehicular glass integrated with the antenna according to claim 1, wherein, the wavelength of that medium is $\lambda_r$, the outer diameter of the inner ring groove is $0.17\lambda_r$ to $0.19\lambda_r$, the inner diameter of the inner ring groove is $0.15\lambda_r$ to $0.17\lambda_r$, the outer diameter of the outer ring groove is $0.21\lambda_r$ to $0.23\lambda_r$, and the inner diameter of the outer ring groove is $0.19\lambda_r$ to $0.21\lambda_r$.

4. The manufacturing method of the vehicular glass integrated with the antenna according to claim 1, wherein four of the feed microstrip lines are uniformly formed on the second surface of the first glass plate along a circumferential direction of the inner ring groove and the outer ring groove, and the feed microstrip lines are disposed along a radial direction of the inner ring groove and the outer ring groove, so as to perform a coupling feed to the antenna radiation layer through the four feed microstrip lines.

5. The manufacturing method of the vehicular glass integrated with the antenna according to claim 3, wherein, the medium wavelength is $\lambda_r$, and the feed microstrip line has a length of $0.12\lambda_r$ to $0.14\lambda_r$ and a width of $0.02\lambda_r$ to $0.04\lambda_r$.

6. The manufacturing method of the vehicular glass integrated with the antenna according to claim 1, further comprising the step of:

preparing a second glass plate, and adhering and fixing the second glass plate on the first surface of the first glass plate, so that the antenna radiation layer is located between the first glass plate and the second glass plate.

7. The manufacturing method of the vehicular glass integrated with the antenna according to claim 1, further comprising the step of:

adhering and fixing a reflecting plate on the second surface of the first glass plate, and locating the feed network layer in a reflecting cavity of the reflecting plate.

8. A vehicular glass integrated with an antenna, wherein comprising:

a first glass plate having a first surface and a second surface;

an antenna radiation layer, comprising a metal layer which is laid on the first surface of the first glass plate and formed with at least one ring groove; and a feed network layer, comprising at least one feed microstrip line which is laid on the second surface of the first glass plate;

wherein the feed network layer performs a coupling feed to the antenna radiation layer, so that a radio frequency electromagnetic field is excited between the first glass plate and the antenna radiation layer, wherein the ring groove comprises an inner ring groove for excitation of a high frequency and an outer ring groove for excitation of a low frequency, which are concentrically arranged from inside to outside, wherein four of the feed microstrip lines are uniformly formed on the second surface of the first glass plate along a circumferential direction of the inner ring groove and the outer ring groove, and the feed microstrip lines are disposed along a radial direction of the inner ring groove and the outer ring groove, so as to perform a coupling feed to the antenna radiation layer through the feed microstrip lines.

9. The vehicular glass integrated with the antenna according to claim 8, wherein, in a state that the first glass plate is mounted on a vehicle body, the first surface of the first glass plate is disposed towards an exterior of a vehicle, and the second surface of the first glass plate is disposed towards an interior of the vehicle.

10. The vehicular glass integrated with the antenna according to claim 8, wherein, a medium wavelength of electromagnetic waves propagating in the first glass plate is $\lambda_r$, an outer diameter of the inner ring groove is $0.17\lambda_r$ to $0.19\lambda_r$, an inner diameter of the inner ring groove is $0.15\lambda_r$ to $0.17\lambda_r$, an outer diameter of the outer ring groove is $0.21\lambda_r$ to $0.23\lambda_r$, and an inner diameter of the outer ring groove is $0.19\lambda_r$ to $0.21\lambda_r$.

11. The vehicular glass integrated with the antenna according to claim 8, wherein, a medium wavelength of electromagnetic waves propagating in the first glass plate is $\lambda_r$, and the feed microstrip line has a length of $0.12\lambda_r$ to $0.14\lambda_r$ and a width of $0.02\lambda_r$ to $0.04\lambda_r$.

12. The vehicular glass integrated with the antenna according to claim 8, wherein, the ring groove has a circular shape, a square shape, a wavy shape or any combination thereof.

13. The vehicular glass integrated with the antenna according to claim 8, wherein, the metal layer is provided with at least one recess and/or at least one protrusion, which is located at a feed position of at least one of the feeding microstrip lines.

14. The vehicular glass integrated with the antenna according to claim 13, wherein, an inner annular surface of the ring groove is recessed inwards along a radial direction thereof to form the at least one recess, or the inner annular surface of the ring groove is protruded outwards along the radial direction thereof to form the at least one protrusion; and/or an outer annular surface of the ring groove is recessed outwards along the radial direction thereof to form the at least one recess, or the outer annular surface of the ring groove is protruded inwards along the radial direction thereof to form the at least one protrusion.

15. A vehicle, comprising a vehicular glass integrated with the antenna, wherein the vehicular glass integrated with the antenna comprises:

a first glass plate having a first surface and a second surface;

an antenna radiation layer, comprising a metal layer which is laid on the first surface of the first glass plate and formed with at least one ring groove; and a feed network layer, comprising at least one feed microstrip line which is laid on the second surface of the first glass plate;

wherein the feed network layer performs a coupling feed to the antenna radiation layer, so that a radio frequency electromagnetic field is excited between the first glass plate and the antenna radiation layer, wherein the ring groove comprises an inner ring groove for excitation of a high frequency and an outer ring groove for excitation of a low frequency, which are concentrically arranged from inside to outside, wherein four of the feed microstrip lines are uniformly formed on the second surface of the first glass plate along a circumferential direction of the inner ring groove and the outer ring groove, and the feed microstrip lines are disposed along a radial direction of the inner ring groove and the outer ring groove, so as to perform a coupling feed to the antenna radiation layer through the feed microstrip lines.

16. The vehicle according to claim 15, wherein the metal layer is provided with at least one recess and/or at least one protrusion, which is located at a feed position of at least one of the feeding microstrip lines.

* * * * *